(12) United States Patent
Fackelmeier et al.

(10) Patent No.: US 10,069,336 B2
(45) Date of Patent: Sep. 4, 2018

(54) INDUCTIVE CHARGING DEVICE, ELECTRIC VEHICLE, CHARGING STATION, AND METHOD FOR INDUCTIVE CHARGING

(71) Applicant: SIEMENS AKTIENGESELLSCHAFT, München (DE)

(72) Inventors: Andreas Fackelmeier, Thalmässing (DE); Fabian Kurz, München (DE); Dominikus Joachim Müller, Eichenau (DE); Reiner Müller, Peiting (DE); Robert Nagel, München (DE); Florian Poprawa, München (DE)

(73) Assignee: Siemens Aktiengesellschaft, München (DE)

( * ) Notice: Subject to any disclaimer, the term of this patent is extended or adjusted under 35 U.S.C. 154(b) by 119 days.

(21) Appl. No.: 14/901,608

(22) PCT Filed: May 23, 2014

(86) PCT No.: PCT/EP2014/060648
§ 371 (c)(1),
(2) Date: Dec. 28, 2015

(87) PCT Pub. No.: WO2014/206661
PCT Pub. Date: Dec. 31, 2014

(65) Prior Publication Data
US 2016/0372955 A1    Dec. 22, 2016

(30) Foreign Application Priority Data

Jun. 28, 2013  (DE) .................. 10 2013 010 975
Jun. 28, 2013  (DE) .................. 10 2013 212 736

(51) Int. Cl.
*H02J 7/00*      (2006.01)
*H02J 50/10*    (2016.01)
(Continued)

(52) U.S. Cl.
CPC ............. *H02J 50/10* (2016.02); *B60L 11/182* (2013.01); *B60L 11/1829* (2013.01);
(Continued)

(58) Field of Classification Search
CPC . H02J 7/025; H02J 50/80; H02J 50/12; B60L 11/182; B60L 11/1829;
(Continued)

(56) References Cited

U.S. PATENT DOCUMENTS 6,154,005 A     11/2000  Hyogo et al.
6,459,995 B1 *  10/2002  Collister .............. G01N 27/221
                                                                    702/104
(Continued)

FOREIGN PATENT DOCUMENTS

CN     102089955 A    6/2011
CN     102355067 A    2/2012
(Continued)

OTHER PUBLICATIONS

Chinese Office Action for related Chinese Application No. 201480036956.5 dated Nov. 2, 2016, with English Translation.
(Continued)

*Primary Examiner* — M'Baye Diao
(74) *Attorney, Agent, or Firm* — Lempia Summerfield Katz LLC (57) ABSTRACT

The invention relates to an inductive charging device having at least one inductive charging coil wound about a coil axis, and an electric or dielectric antenna, which is arranged at a location that is shifted parallel to the coil axis in relation to a location of a region of the charging coil, a location within
(Continued)

the at least one charging coil, or a location between the charging coils. The electric vehicle and the charging station each have such an inductive charging device. With the method, one or two such inductive charging devices are used, wherein by means of the inductive charging coils, energy is transmitted, and by means of the antennas, communications data are transmitted.

15 Claims, 6 Drawing Sheets (51) Int. Cl.
  H02J 50/70 (2016.01)
  H01F 38/14 (2006.01)
  H02J 5/00 (2016.01)
  H01Q 9/04 (2006.01)
  H01Q 13/24 (2006.01)
  H01Q 21/06 (2006.01)
  B60L 11/18 (2006.01)
  H02J 50/80 (2016.01)
  H02J 50/12 (2016.01)
  H02J 7/02 (2016.01)

(52) U.S. Cl.
  CPC .......... *B60L 11/1838* (2013.01); *H01F 38/14* (2013.01); *H01Q 9/0485* (2013.01); *H01Q 13/24* (2013.01); *H01Q 21/062* (2013.01); *H02J 5/005* (2013.01); *H02J 7/025* (2013.01); *H02J 50/12* (2016.02); *H02J 50/70* (2016.02); *H02J 50/80* (2016.02); *B60L 2230/10* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01)

(58) Field of Classification Search
  CPC ... B60L 11/1838; H01F 38/14; H01Q 9/0485; H01Q 13/24
  USPC .......................................................... 320/108
  See application file for complete search history.

(56) References Cited

U.S. PATENT DOCUMENTS

| | | |
|---|---|---|
| 8,466,654 B2 | 6/2013 | Cook et al. |
| 8,729,859 B2 | 5/2014 | Cook et al. |
| 2001/0035734 A1 | 11/2001 | Koike et al. |
| 2011/0193520 A1 | 8/2011 | Yamazaki et al. |
| 2013/0093387 A1 | 4/2013 | Vassilieff et al. |

FOREIGN PATENT DOCUMENTS

| | | |
|---|---|---|
| DE | 202009009693 U1 | 12/2010 |
| DE | 102010063665 A1 | 6/2012 |

OTHER PUBLICATIONS

German Office action for related German Application No. 10 2013 212 736.7, dated Oct. 21, 2013, with English Translation.
PCT International Search Report and Written Opinion of the International Searching Authority dated Sep. 11, 2014 for corresponding PCT/EP2014/060648.

* cited by examiner

INDUCTIVE CHARGING DEVICE, ELECTRIC VEHICLE, CHARGING STATION, AND METHOD FOR INDUCTIVE CHARGING

The invention relates to an inductive charging device, an electric vehicle, a charging station and a method for inductive charging.

In addition to contact-based options for the charging of a battery with a cable, specifically in an electric vehicle, with direct current or alternating current (conductive charging), the transmission of energy to a battery, for example in an electric vehicle, by means of induction is also known (inductive charging, wireless charging).

To this end, specifically in the case of the inductive charging of electric vehicles, there are three key parameters which must be considered simultaneously:

the position of the charging coil(s) on the secondary side, i.e. the position of that (those) charging coil(s) which are in electrical contact with the battery to be charged, in relation to the position of the charging coil(s) on the primary side, i.e. the side which delivers the requisite charging energy, for example a charging station for the charging of electric vehicles, the clear identification of the primary side, for example of the electric vehicle arranged above the charging coil(s);

clear, stable and secure communication between the primary and secondary sides, for example between a charging station and an electric vehicle, during a charging process, in order to prevent "crosstalk", for example between an electric vehicle and the primary side of a further charging station in the immediate vicinity.

A further parameter to be considered in inductive charging is the monitoring of the air gap between the primary side and the secondary side during the charging process.

In order to achieve the maximum possible efficiency in the inductive transmission of energy, it is desirable that the respective charging coils of the inductive charging system on the primary side and the secondary side should be positioned as accurately as possible in relation to each other.

In addition to the accuracy of coil positioning, clear and secure communication between the infrastructure and the vehicle is also a prerequisite for a secure and efficient charging process. Given that, in the case of inductive charging, the electric vehicle is not connected to the infrastructure by means of a cable, it is also desirable that a wireless system should be used for communication purposes. In this scenario, a wireless system of this type must be protected as effectively as possible against interference from electromagnetic waves.

To this end, for example for the inductive charging of electric vehicles, an arrangement is known whereby the driver of said electric vehicle is provided with navigational assistance upon arrival at the charging station. For example, an antenna may be incorporated into the roof of the electric vehicle. Control of the charging power flux during the charging process would also be advantageous. In consequence, reliable communication during the charging process is also desirable.

In the context of the prior art, the object of the invention is the proposal of a charging device by means of which, firstly, the accurate positioning of the charging coils in relation to a corresponding charging device is possible. It is also intended that reliable communication with the charging device during the charging process should be possible. A further object of the invention is the proposal of an improved charging station and an improved electric vehicle. An object of the invention is also the proposal of an improved method for inductive charging.

This object is fulfilled by a charging device having the characteristics described in claim 1, by an electric vehicle having the characteristics described in claim 10, by a charging station having the characteristics described in claim 11, and by a method for inductive charging having the characteristics described in claim 12. Preferred further developments of the invention are presented in the associated sub-claims, the following description and the diagrams.

The charging device according to the invention is an inductive charging device, i.e. a charging device for inductive charging. Specifically, the charging device according to the invention is configured with a corresponding charging device for this purpose, i.e. energy is transmitted inductively from the charging device according to the invention to the corresponding charging device and/or is inductively received from the corresponding charging device. The inductive charging device is provided with at least one inductive charging coil wound around a coil axis, and with an electric or dielectric antenna. The electric or dielectric antenna is arranged in or on the at least one charging coil and/or within the at least one charging coil and/or between the charging coils and/or at a location which is displaced in parallel to the coil axis in relation to a location in a given region of the charging coil and/or in relation to a location within the at least one charging coil and/or in relation to a location between the charging coils. This means that the electric or dielectric antenna is arranged at a location which is defined by the displacement of a location in a given region of the charging coil, of a location within the at least one charging coil or of a location between the charging coils, in a parallel direction to the coil axis. Within the meaning of the present invention, parallel displacement to the coil axis is to be understood, in all cases, as displacement in the direction of the coil axis. Appropriately, at least part of the electric or dielectric antenna is arranged at a location of the type described above. Preferably, the geometrical center of gravity or the physical center of gravity of the antenna is arranged at a location of the type described above.

Within the meaning of the present invention, a coil axis is to be understood as a notional axis which, in the case of flat-wound coils, is perpendicular to the plane of the windings or turns. In the case of spiral-wound charging coils, a coil axis within the meaning of the present invention is to be understood as the longitudinal helical axis. In general, the term coil axis refers to that axis around which the windings of the charging coil are almost exclusively wound, either circumferentially or radially, excluding any corrections incorporated on the grounds of the width of windings or winding clearances.

Within the meaning of the present invention, an electric antenna is specifically to be understood as an antenna which is not predominantly or exclusively coupled to the magnetic components of the electromagnetic field, but is preferably predominantly, and most preferably virtually exclusively coupled to the electrical components of the electromagnetic field. Specifically, an electric antenna is to be understood as an electric dipole antenna. It is appropriate that the concept of an electric antenna should be distinguished from that of a magnetic antenna, i.e. a frame antenna or coil antenna should not be included in the concept of an electric antenna.

By means of the inductive charging device according to the invention, it is also possible, by means of the electric or dielectric antenna, to constitute a wireless channel for short-range wireless communication with a corresponding charging device, during the charging process. As a result of the parallel displacement to the coil axis of the arrangement of the electric or dielectric antenna in relation to locations in given regions of the at least one charging coil and/or within the at least one charging coil, or in regions between the charging coils, and/or the arrangement of the electric or dielectric antenna in or on the at least one charging coil and/or within the at least one charging coil and/or between the charging coils, the antenna is arranged within or close to the inductive power flux. Accordingly, immediately when the at least one inductive charging coil of the inductive charging device is appropriately positioned for a charging process, the antenna will simultaneously be appropriately oriented for a communication process with a corresponding charging device. Specifically, by the use of mutually-corresponding charging devices according to the invention, on both the primary and the secondary sides, reliable, secure and clear communications can easily be effected by means of charging devices according to the invention.

Conversely, communication by means of the antenna can also be exploited in order to achieve a reliable mutual positioning of the respective charging coils of the charging devices according to the invention. The spatial arrangement of the antenna and the at least one charging coil of the respective charging device according to the invention is such that, where the antennae are positioned sufficiently close to each other to ensure reliable communication, an adequate relative mutual positioning of the charging coils of the charging devices is achieved for the purposes of inductive charging.

Accordingly, the appropriate positioning of the antenna of the charging device according to the invention is dependent upon the appropriate positioning of the at least one charging coil of the charging device, and vice versa. Specifically in the case of the inductive charging of electric vehicles by means of a charging station, this circumstance is particularly advantageous: for example, where the electric vehicle is already parked on an inductive charging station, said electric vehicle will only require alignment in its longitudinal axis, without complex maneuvers. In the case of an electric vehicle where, as known from the prior art, the charging coil and an antenna used for communication purposes are arranged at any desired distance from each other, secure, clear and reliable communication for the charging process cannot be adequately guaranteed, and may only be achievable by the realignment of the vehicle. Conversely, good positioning for communication purposes does not simultaneously imply the adequate positioning of the charging coils.

The configuration of the antenna according to the invention as a dielectric or an electric antenna also permits said antenna to be introduced into the inductive magnetic charging field of the charging coils. An antenna which is susceptible to strong coupling to the magnetic components of the electromagnetic field, for example a magnetic antenna such as a frame or coil antenna, at the power levels employed in inductive charging, might easily be damaged or even destroyed by the eddy currents associated with the inductive charging field. Conversely, electric or dielectric antennae can easily be configured with a non-metallic or loop-free construction, such that the generation of eddy currents can easily be avoided. At the same time, an antenna configuration of this type can prevent interference with the inductive charging field. Accordingly, in the charging device according to the invention, the level of efficiency of inductive charging is not, or not necessarily impaired. In other words, a communication system based upon an electric or a dielectric antenna is robustly configurable such that, notwithstanding the customary strong electromagnetic fields associated with inductive charging, secure and clear communications, for the control of charging and/or for the monitoring of the charging process, can be maintained during charging.

In the charging device according to the invention, specifically in the case of dielectric antennae, it is also possible, by means of said antennae, to achieve dielectric high-frequency signal transmission (HF signal transmission), whereby said antennae, incorporating no metallic components, are configurable in the power flux between two charging coils. Accordingly, eddy currents in the antenna can be effectively prevented.

In a preferred further development of the invention, the inductive charging device forms a primary side of an inductive charging system. The inductive charging device is appropriately provided with an electrical circuit contact, by means of which the at least one charging coil of the inductive charging device is in electrical contact with, or is electrically contactable to an energy source.

In a further alternative and preferred further development of the invention, the inductive charging device forms a secondary side of an inductive charging system. The inductive charging device is appropriately provided with an electrical circuit contact, by means of which the at least one charging coil of the inductive charging device is in electrical contact with, or is electrically contactable to an energy storage device.

The inductive charging device according to the invention is appropriately provided with electromagnetic field screening. To this end, both the at least one inductive charging coil and the at least one electric or dielectric antenna of the inductive charging device are arranged on and/or near the same side of said field screening.

In the inductive charging device according to the invention, the electric or dielectric antenna is advantageously arranged at a location which is displaced, in parallel to the coil axis, in relation to the location of the geometrical center of gravity of the coil interior(s) and/or at the location of the geometrical center of gravity of the charging coil interior(s). This means that the electric or dielectric antenna is arranged at a location which is dictated by the displacement of the location of the geometrical center of gravity of the coil interior(s) in a parallel direction to the coil axis.

In the inductive charging device according to the invention, the electric antenna is appropriately provided with at least one dipole antenna, comprising at least one or more dipoles. The dipole antenna is advantageously provided with one or more electric dipoles, which are specifically formed by extended conductor ends. Said conductor ends form no loops, such that the generation of eddy currents is effectively prevented.

In the inductive charging device according to the invention, the dielectric antenna is preferably provided with at least one, and specifically dielectric, waveguide. By this arrangement, the dielectric antenna can be of substantially or entirely non-metal construction, such that the generation of eddy currents is effectively prevented.

In an advantageous further development of the inductive charging device according to the invention, the field screening is provided with a penetration. In the inductive charging device according to the invention, the waveguide is appropriately routed through said penetration.

In the inductive charging device according to the invention, the dielectric antenna is preferably configured as a dielectric resonator antenna, or the dielectric antenna is provided with a dielectric resonator antenna. In dielectric resonator antennae, for example in comparison with a patch antenna, the generation of eddy currents can also be effectively prevented, as metal surfaces for the configuration of patch antennae as excitation components can be omitted.

The electric vehicle according to the invention is provided with an inductive charging device, of the type described above.

The charging station according to the invention is provided with an inductive charging device, of the type described above.

The method for inductive charging according to the invention, specifically of an energy storage device in an electric vehicle, involving one or two device(s) as claimed in one of the preceding claims and wherein, by means of the at least one inductive charging coil, energy is transmitted to one of said devices and, by means of the electric or dielectric antenna, communication data are transmitted to one of said devices respectively. In the method according to the invention, communication data transmitted appropriately include data for the control and/or monitoring of inductive charging, and specifically the charging power.

The invention is described in greater detail with reference to the examples of embodiment shown in the diagrams. In the diagrams.

Figure 1:
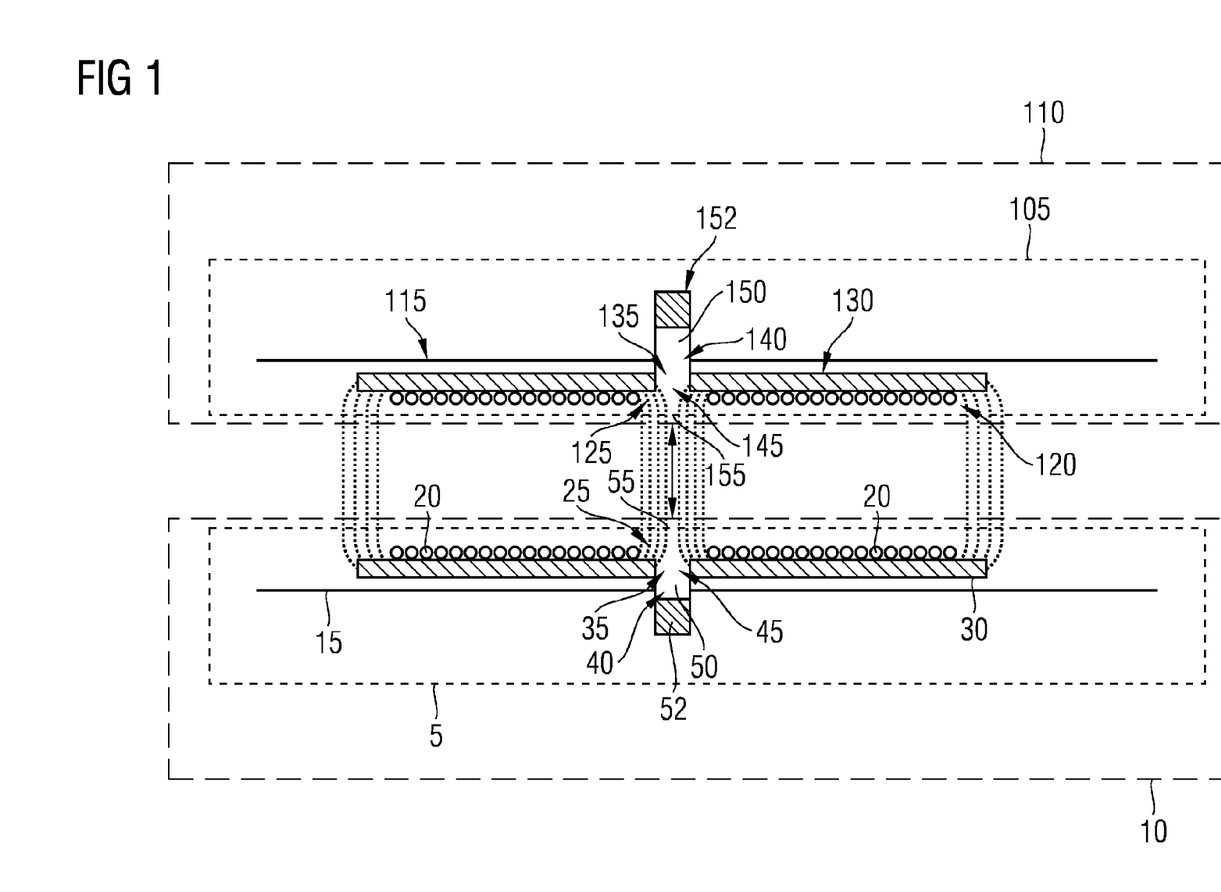
FIG. 1 shows an arrangement of an inductive charging device according to the invention, with a primary charging coil and a dielectric antenna, and of a further inductive charging device according to the invention, with a secondary charging coil and a further dielectric antenna, represented schematically in longitudinal section.

The arrangement represented in FIG. 1 comprises, firstly, an inductive charging device 5, according to the invention, of a charging station 10 (not fully represented) for electric vehicles.

The charging device 5 of the charging station 10 is provided with two-dimensional and level electromagnetic screening 15. In the example of embodiment represented in FIG. 1, the screening 15, with its two-dimensional extensions, is arranged in parallel to the ground surface (not represented in detail). Above the screening 15, a charging coil is arranged in the form of a flat coil 20. The flat coil 20 forms a primary-side charging coil for the charging of an electric battery (not represented in detail) in an electric vehicle 110. As represented in FIG. 1, the electric vehicle is positioned exactly over the charging station. As represented in FIG. 1, a winding plane of the flat coil 20 is arranged in parallel to the ground surface and, accordingly, in parallel to the two-dimensional extension of the screening 15. In this winding plane, the circumferential wire turns of the flat coil 20 enclose a coil interior 25, the cross section of which, in parallel directions to the ground surface, shows the form of a quadrilateral with rounded corners (in unrepresented examples of embodiment, the cross section may show a different form).

Between the flat coil 20 and the screening 15, a field-conducting ferrite layer 30 is arranged on said flat coil 20. The ferrite layer 30 is configured as a flat component, the two-dimensional extensions of which extend in parallel to the winding plane of the flat coil 20. In alignment with the coil interior 25, the ferrite layer 30 and the screening 15 are each provided with penetrations 35, 40.

The arrangement represented in FIG. 1 also comprises a secondary-side inductive charging device 105 of an electric vehicle 110. The inductive charging device 105 of the electric vehicle 110, similarly to the charging device 5 of the charging station 10, is provided with level and two-dimensional screening 115, a secondary-side charging coil configured as a flat coil 120 with a coil interior 125, and a field-conducting ferrite layer 130, whereby the screening 115 and the ferrite layer 130 are also provided with penetrations 135, 140 in alignment with the coil interior 125. The screening 115, the flat coil 120 and the ferrite layer 130 of the charging device 105 of the electric vehicle 110 are configured similarly to the screening 15, the flat coil 20 and the ferrite layer 30 of the charging device 5 of the charging station 10, in a mirror-image arrangement to the latter (in relation to a notional mirror plane, arranged in parallel to the ground surface). The coil axes (not represented individually) of the flat coil 20 of the charging station 10 and the flat coil 120 of the electric vehicle 110 are in alignment with each other, and are perpendicular to the ground surface.

In the arrangement shown in FIG. 1, as a result of the mutual alignment of the coil axes thus described, the electric vehicle 110 is in an appropriate position for inductive charging. In FIG. 1, each of the coil axes runs vertically and centrally through the coil interiors 25, 125.

In the primary-side inductive charging device 5 of the charging station 10, the flat coil 20, for the purposes of current infeed, is provided with an electrically-conductive connection to a power grid (not represented).

In the secondary-side inductive charging device 105 of the electric vehicle 110, the flat coil 120 is provided with an electrically-conductive connection to an electric battery (not represented) of the electric vehicle 110.

In a first example of embodiment, as represented in FIG. 1, both the primary-side charging device 5 and the secondary-side inductive charging device 105 are provided with a dielectric antenna 45, 145 respectively.

In this example of embodiment, the dielectric antennae 45, 145 are each provided with a waveguide 50, 150. The waveguide 50 of the primary-side charging device 5, the longitudinal extension of which is perpendicularly-oriented to the ground surface, is routed through the mutually aligned penetrations 35, 40 in the screening 15 and the ferrite layer 30. On the flat side of the screening 15 facing outwards from the flat coil 20, the waveguide 50 is connected to a supply device 52 for the supply of a high-frequency electromagnetic field, for the purposes of communication with the secondary-side dielectric antenna 145 of the secondary-side charging device 105 (not represented in detail in FIG. 1). At its longitudinal end, which extends on the side of the screening 15 facing the flat coil 20, from the above-mentioned side of the screening 15, the waveguide 50 is provided with an offtake 55. Accordingly, said offtake 55 constitutes a source for the high-frequency electromagnetic field, such that the waveguide 50 thus supplied, with the offtake 55, is classified as a dielectric antenna.

Analogously, the waveguide 150 of the secondary-side charging device 105, the longitudinal extension of which is perpendicularly-oriented to the ground surface, is routed through the mutually aligned penetrations 135, 140 in the screening 115 and the ferrite layer 130. At its longitudinal end, which extends on the side of the screening 115 facing the flat coil 120, from the above-mentioned side of the screening 115, the waveguide 150 is provided with an intake 155. Accordingly, said intake 155 constitutes a sink for the high-frequency electromagnetic field, such that the waveguide 150, with the intake 155, is also classified as a dielectric antenna, in this case a receiving antenna. On the flat side of the screening 115 facing outwards from the flat coil 120, the waveguide 150 is connected to a receiving electronic circuit 152 for the processing of incoming electromagnetic waves routed via the waveguide 150.

In a further example of embodiment, which otherwise corresponds to the example of embodiment described above, both the dielectric antenna 45 of the primary-side charging device 5 and the dielectric antenna 145 of the secondary-side charging device 105 are additionally connected respectively to a supply device for the supply of a high-frequency electromagnetic field, for the purposes of communication, and to a receiving electronic circuit for the processing of signals from the respective waveguide 50, 150 of the respective dielectric antenna 45, 145; accordingly, in this example of embodiment, both the dielectric antenna 45 of the primary-side charging device 5 and the antenna 145 of the secondary-side charging device 105 function simultaneously as a transmitting antenna and a receiving antenna. In this example of embodiment, bidirectional communication between the primary-side charging device 5 and the secondary-side charging device 105 is therefore possible.

For example, in the example of embodiment described above, the polarization of electromagnetic waves at the intake in the respective waveguides 50, 150 of the dielectric antennae 45, 145 may be selected such that said polarization is perpendicularly-oriented to the winding plane of the flat coils 20, 120, given that the field in this direction of polarization will already project substantially into the flat coil. Where the flat coils 20, 120, as represented in FIG. 1, lie in the beam direction of the dielectric antennae 45, 145, these will function respectively, in approximate terms, as lattice polarizers. In the event of this polarization, however, the respective flat coils 20, 120 should not be responsible for any substantial damping of the electromagnetic waves as the waves pass through the flat coils 20, 120.

The constituent material of the dielectric waveguides 50, 150 in the examples of embodiment described above is e.g. Teflon with a comparatively low dielectric constant $\in_r$ ($\in_r$<2.5). The waveguides 50, 150 are configured, for example, in a circular-cylindrical form with a circle diameter of ½λ (e.g. for communication envisaged by means of dielectric antennae 45, 145 in the CAR2X-band at 5.8 GHz, a circle diameter of the order of 3 cm). In further examples of embodiment, however, the circle diameter may be larger. Measurements completed using a Teflon waveguide 50, 150, with a circle diameter of the waveguide 50, 150 of 3 cm at 5.8 GHz have shown that the directive efficiency of the dielectric antennae 45, 145 is extremely high, as virtually flat wave fronts are present in this case.

In further unrepresented examples of embodiment, which otherwise correspond to the examples of embodiment described above, the waveguides 50, 150 of the dielectric antennae 45, 145 are configured of a dielectric material, for example a ceramic material, with a significantly higher dielectric constant, for example with a dielectric constant of up to 140. In these examples of embodiment, the waveguide is configured with a significantly smaller circle diameter, corresponding to the higher dielectric constant.

Figure 2A:
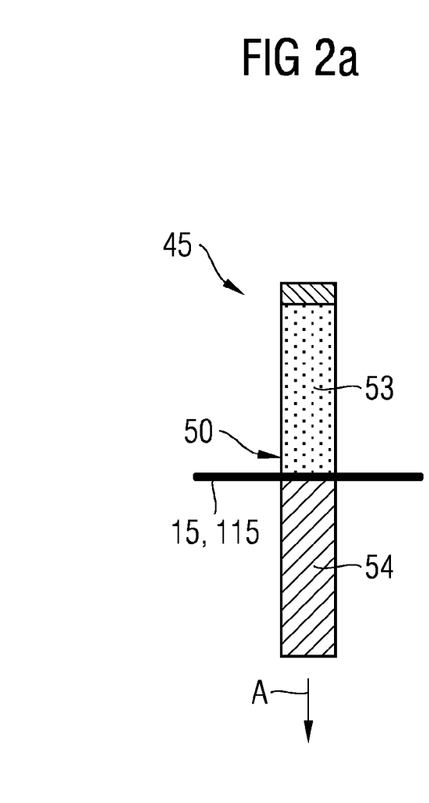
FIG. 2 shows examples of embodiment for the configuration of the dielectric antennae of charging devices according to the invention, represented schematically in longitudinal section in FIG. 1.

In further examples of embodiment, which otherwise correspond to the examples of embodiment described above, the intake 155 or offtake 55 of the waveguides 50, 150 of the dielectric antennae 45, 145 are configured as represented in FIG. 2:

Accordingly, in a first example of embodiment represented in FIG. 2, the waveguide 50, 150, on the respective side of the screening 15, 115 which faces away from the flat coil 20, 120 associated with the respective inductive charging device 5, 105, is comprised of a first dielectric material 53 and, on the respective side facing towards the flat coil 20, 120 associated with the respective inductive charging device 5, 105, of a second dielectric material 54 (FIG. 2*a*). In this example of embodiment, the second dielectric material 54 shows a lower dielectric constant than the first dielectric material 53. However, the diameter of the waveguide 50, 150 in the example of embodiment represented in FIG. 2*a* remains unchanged. By this arrangement, a high directive efficiency of the dielectric antenna 45, 145 can be achieved in a direction of emission A. However, as a result of the higher dielectric constant of the first material 53, for the purposes of guidance in the vicinity of the penetrations 40, 140 in the screening 15, 115, the field is sufficiently localized in the waveguide 50, 150.

Figure 2B:
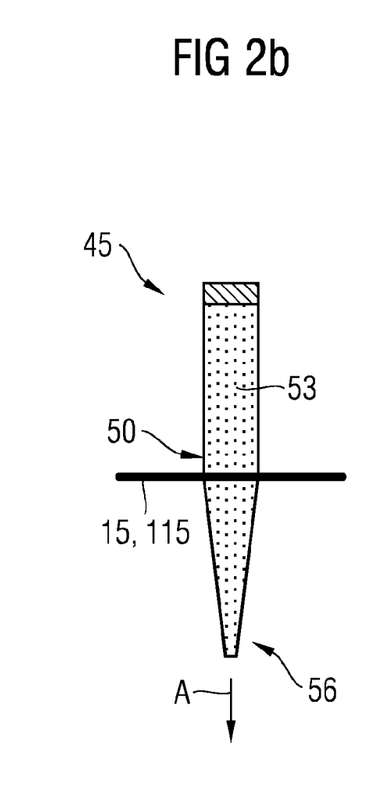

In a second example of embodiment represented in FIG. 2 (FIG. 2*b*), the waveguide 50, 150 on both sides of the screening 15, 115 is comprised of the same dielectric material 53. However, on the respective side facing towards the flat coil 20, 120 associated with the respective inductive charging device 5, 105, the diameter of the waveguide 50, 150 decreases as the distance from the screening 15, 115 increases, such that the waveguide 50, 150 tapers to a point 56 in the vicinity of the intake 155 or the offtake 55. By this arrangement, a high directive efficiency of the dielectric antenna 45, 145 in a direction of emission A can also be achieved. However, as a result of the larger diameter of the waveguide 50, 150 on the side of the screening 15, 115 facing away from the flat coil 20, 120 associated with the respective charging device 5, 105, for the purposes of guidance in the vicinity of the penetrations 40, 140 in the screening 15, 115, the field is sufficiently localized in the waveguide 50, 150.

Figure 2C:
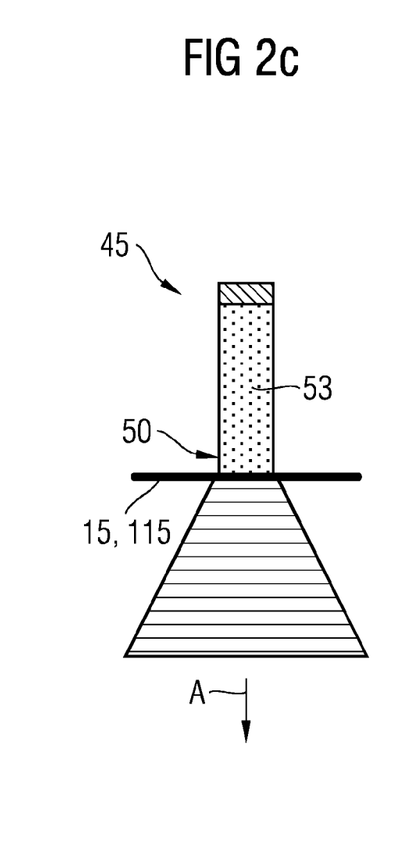

In a third example of embodiment represented in FIG. 2, the waveguide 50, 150, on the respective side of the screening 15, 115 which faces away from the flat coil 20, 120 associated with the respective inductive charging device 5, 105, is comprised of a first dielectric material and, on the respective side facing towards the flat coil 20, 120 associated with the respective inductive charging device 5, 105, of a second dielectric material (FIG. 2*c*). In this example of embodiment, the second dielectric material shows a lower dielectric constant than the first dielectric material. The diameter of the waveguide 50, 150 increases progressively on the respective side facing the flat coil 20, 120 associated with the respective inductive charging device 5, 105 in the direction of the screening 15, 115. By this arrangement, a high directive efficiency of the dielectric antenna 45, 145 in a direction of emission A can also be achieved. However, as a result of the higher dielectric constant of the first material, for the purposes of guidance in the vicinity of the penetrations 40, 140 in the screening 15, 115, the field is sufficiently localized in the waveguide 50, 150.

Figure 3:
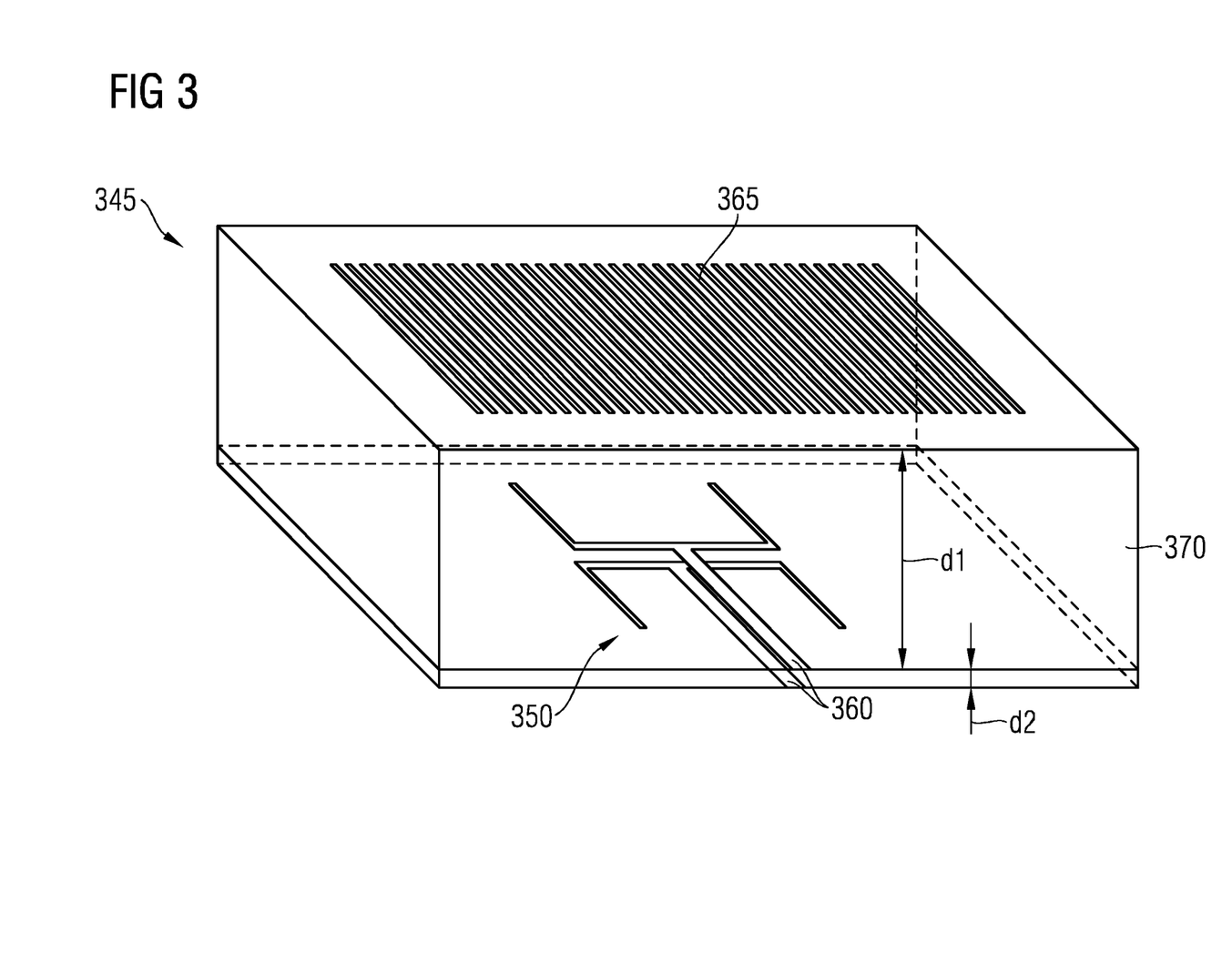
FIG. 3 shows a section of an electric antenna which, in a further example of embodiment of an inductive charging device according to the invention, replaces the dielectric antenna of the electric antenna according to the invention, in accordance with FIG. 1, represented schematically in a perspective view.

The further example of embodiment of the charging devices 5, 105 according to the invention represented in FIG. 3 corresponds to the examples of embodiment described with reference to FIG. 1. Unlike these examples of embodiment, however, an electric antenna 345 is provided in place of a dielectric antenna 45, 145 in each case.

The electric antenna 345 comprises an 8-way dipole array 350 with two-component dipole elements 355 and two symmetrical signal conductors 360 routed to the respective components of the dipole elements 355, mutually spaced in the direction of the coil axes of the flat coils 20, 120 by d2=0.25 millimeters (in other examples of embodiment, the clearance d2 may be different). Each of the dipole elements 355 is provided with two dipole components, which are connected respectively to one of the symmetrical signal conductors 360. The two dipole components of a respective dipole element 355 are formed respectively by a wire which projects from the signal conductor 360. Accordingly, the two dipole components of a respective dipole element 355 extend outwards from each other in a mutually parallel orientation. For each polarization plane covered by the antenna 345, the dipole components of all the dipole elements 355 show a mutually parallel orientation.

The electric antenna 345 also comprises a strip-type reflector 365. The reflector 365 is comprised of mutually parallel metal strips, arranged in a plane which is parallel to the winding plane of the flat coil 20, 120 associated with the respective charging device 5, 105, of respective width of the order of one millimeter, or of smaller width. The strips run in parallel to the extensions of the dipole elements 355.

The dipole array 350 is configured as a flat structure, the horizontal plane of which extends in parallel to the winding plane of the flat coil 20, 120 associated with the respective charging station 5, 105.

The dipole array 350 and the reflector 365 are embedded in a dielectric substrate 370, which shows a dielectric constant of 10.2. The clearance between the reflector and the dipole elements is d1=2.5 millimeters, corresponding to one twentieth of the free-space wavelength which the respective electric antenna 45, 145 is configured to emit or receive. In further examples of embodiment, the clearance d1 and the dielectric constant may be different.

Figure 4:
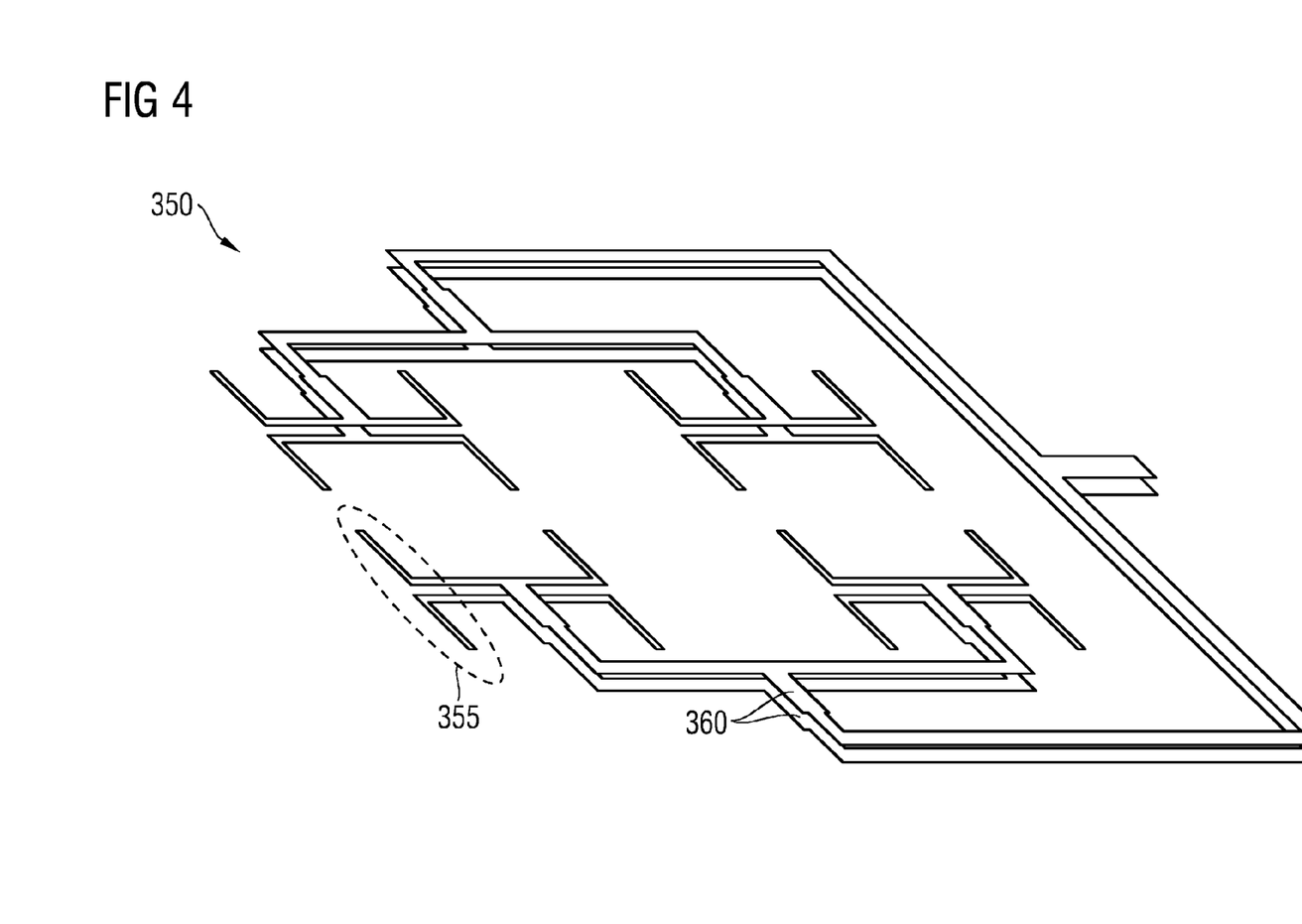
FIG. 4 shows the electric antenna in accordance with FIG. 3, represented schematically in a perspective view.

The power dividers of the dipole array may be configured as a T-junction power divider, as represented in FIG. 4 or, for example, as a Wilkinson divider with symmetrical conductor routing (not represented itself in the diagram). In a further example of embodiment (not shown separately in the diagram), dipole elements 355 are provided in the form of folded dipoles, which show a high impedance. In this case, the conductors of the array are simply combined (thereby halving the impedance), such that the resulting impedance is of the order of 50 ohms. In order to reduce induced loop currents in the folded dipoles, the latter can be configured with a series capacitor. The electric antenna 345 is connected to a coaxial cable via a balun transformer, where applicable after adjustment to 50 ohms.

Figure 5:
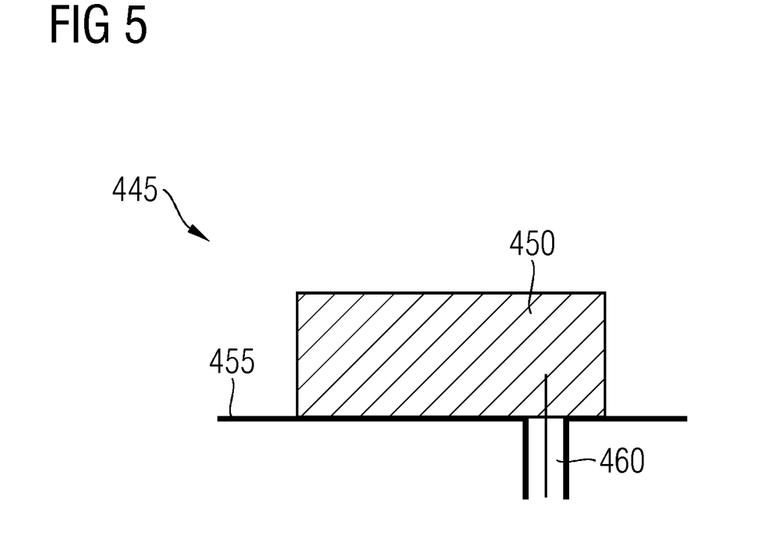
FIG. 5 shows a dielectric resonator antenna which, in a further example of embodiment of an inductive charging device according to the invention, replaces the dielectric antenna of the dielectric antenna according to the invention, in accordance with FIG. 1, represented schematically in longitudinal section.

The dielectric antennae 445 represented in FIGS. 5 and 6 which, in the examples of embodiment of the charging devices 5, 105 according to the invention described hereinafter, assume the role of the antennae 45, 145, 345 described above, are configured as dielectric resonator antennae 445. Moreover, the examples of embodiment described in conjunction with FIGS. 5 and 6 correspond to those previously described with reference to FIG. 1. In each case, in an inherently known arrangement, the emitter element of the dielectric resonator antennae 445 is configured as a dielectric resonator 450 which, by the supply of an appropriate wavelength and polarization, is operable in resonance and, in the example of embodiment represented, is operated in resonance. In the examples of embodiment represented in FIGS. 5 and 6, the dimensions of the dielectric resonator 450 of the dielectric resonator antenna 445 are of the order of a few millimeters.

The resonant frequency is dependent upon the dielectric constant $\in_r$ of the material and, accordingly, also dictates the dimensions of the dielectric resonator 450 of the dielectric resonator antenna 445. In the examples of embodiment represented in FIGS. 5 and 6, this dimension is of the order of $\lambda/\sqrt{2}$, where $\lambda$ is the free-space wavelength.

For example, the dielectric resonator 450 of the dielectric resonator antenna 445 is configured in the form of a cylinder, specifically a circular cylinder, or a cuboid. In the example of embodiment represented in FIG. 5, the dielectric resonator antenna 445 is mounted on a grounding surface 455. The dielectric resonator antenna 445 is supplied by means of a coaxial conductor 460. To this end, in the example of embodiment represented, the coaxial conductor 460 is routed from the screening 15, 115 to the outward-facing side from the flat coil 20, 120 associated with the respective charging device 5, 105. The grounding surface 455 is configured in a two-dimensional and level arrangement in the plane of the screening 15, 115 and consequently, in the arrangement represented in FIG. 1, parallel to the ground surface.

In further examples of embodiment, which are not represented separately, other supply variants may be applied. These other supply variants include, for example, slotted couplings based upon microstrip conductors, in an inherently known arrangement.

Figure 6:
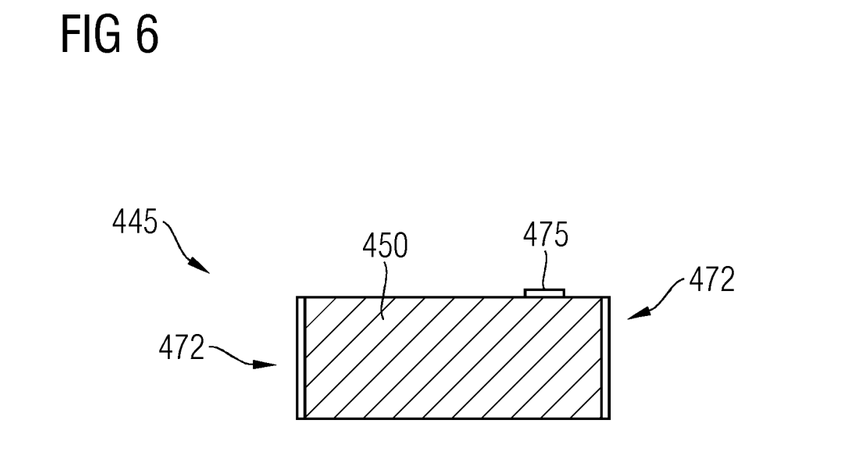
FIG. 6 shows an alternative dielectric resonator antenna which, in a further example of embodiment of an inductive charging device according to the invention, replaces the dielectric antenna of the dielectric antenna according to the invention, in accordance with FIG. 1, represented schematically in longitudinal section.

In the example of embodiment represented in FIG. 6, the dielectric resonator antenna 445 is configured as a "metalized" dielectric resonator antenna 445, which is constructed without a grounding surface 455. To this end, those sides 472 of the dielectric resonator 450 of the dielectric resonator antenna 445 which are respectively perpendicular to the two-dimensional directions of orientation of the screening 15, 115, and consequently perpendicular to the winding plane of the flat coil 20, 120 of the respective associated charging device 5, 105, are metalized. The dielectric resonator antenna is also provided with a metallic feed point 475 on an end face of the dielectric resonator 450. This arrangement also ensures the particularly effective prevention of the generation of eddy currents.

In a further example of embodiment, the dielectric antenna 445 in accordance with FIG. 6 is arranged respectively in the coil interior 25, 125 of the flat coil 20, 120 of the respective charging device 5, 105.

Figure 7:
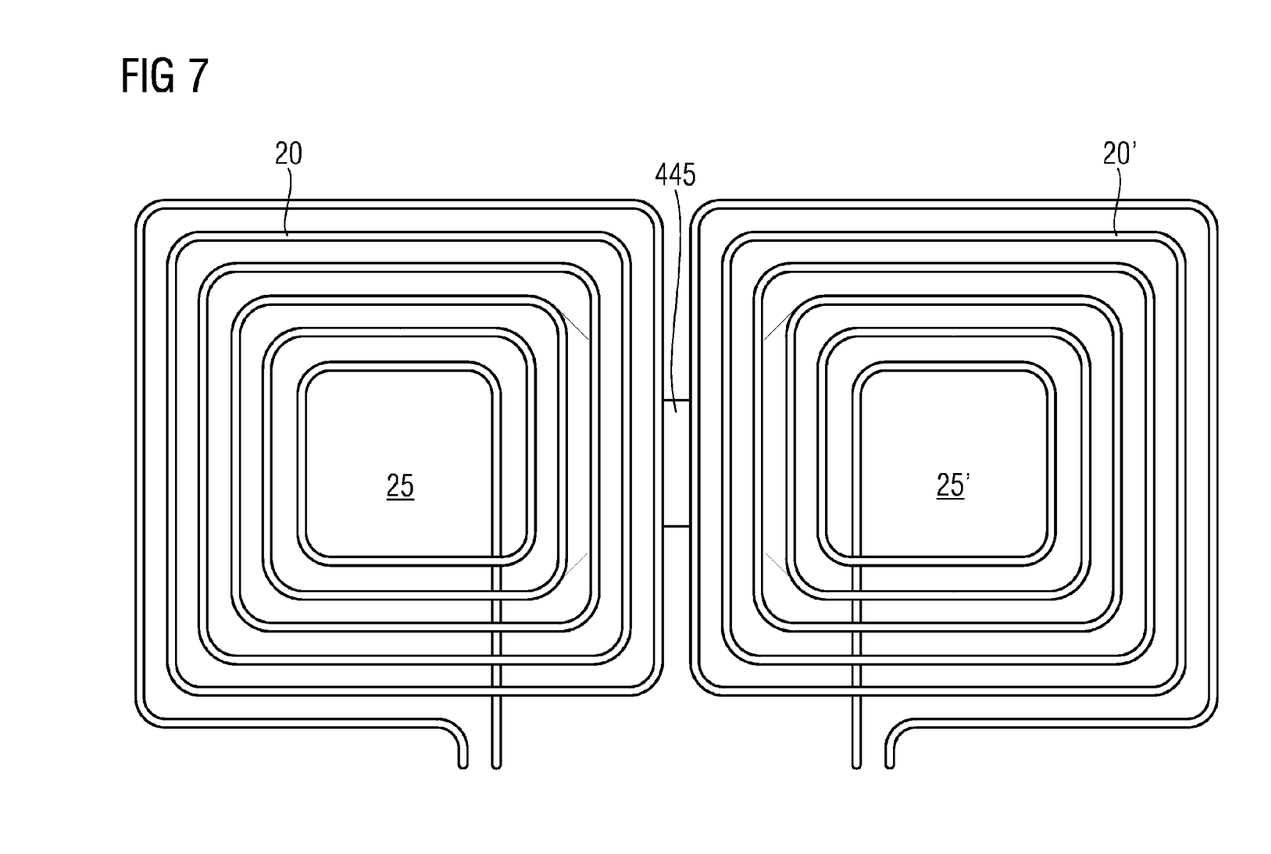
FIG. 7 shows a further example of embodiment of an inductive charging device according to the invention, with two charging coils and a dielectric antenna arranged between said charging coils, represented schematically in cross section.

In the example of embodiment represented in FIG. 7, which otherwise corresponds to the examples of embodiment described above involving a dielectric resonator antenna 445, a single flat coil 20 in the primary-side charging device 5 is replaced respectively by two flat coils 20, 20' (in a further example of embodiment, the secondary-side charging device 105, in a mirror-image arrangement, is configured with two flat coils, such that embodiments of this example of embodiment also involve a secondary-side charging device which is configured in a corresponding manner). The dielectric resonator antenna 445 is arranged between the flat coils 20, 20', and shows dimensions of the order of a few millimeters. The coil interior of the flat coils 20, 20' shows dimensions of 200 by 200 millimeters. The external dimensions of each individual flat coil 20, 20' are 500 millimeters.

The electric vehicle 110 according to the invention is provided with the secondary-side inductive charging device 105, as described in greater detail in the preceding examples of embodiment.

The charging station 10 according to the invention incorporates the primary-side inductive charging device 5, as described in greater detail in the preceding examples of embodiment, and is configured for the charging of an electric vehicle 110.

According to the invention, by means of the previously described primary-side charging device 5 according to the invention and the secondary-side charging device 105 according to the invention, by means of the inductive flat coil 20 of the primary-side charging device 5 and the inductive flat coil 120 of the secondary-side charging device 105, energy is transmitted between the primary-side charging device 5 and the secondary-side charging device 105. During this energy transmission, by means of the respective electric 345 or dielectric antennae 45, 145, 445 of the primary-side charging device 5 and the secondary-side charging device 105, communication data are transmitted between the primary-side charging device 5 and the secondary-side charging device 105.

In the examples of embodiment described with reference to FIGS. 1 to 6, at least part of the antenna is arranged at a location within the flat coil 20, 120. In further examples of embodiment not individually represented, which otherwise correspond to the examples of embodiment represented in FIGS. 1 to 6, the geometrical or physical center of gravity of the antenna is located within the respective flat coil 20, 120. In the examples of embodiment described with reference to FIG. 7, the antenna, at least in part, is located on the geometrical center of gravity of the interiors 25, 25' of the flat coils 20, 20'. In further examples of embodiment not individually represented, the antenna is displaced in relation to said center of gravity in the direction of the coil axis, away from the screening 15 and the ferrite layer 30.

The invention claimed is:
1. An inductive charging device comprising:
   at least one inductive charging coil wound around a coil axis;
   an electric or dielectric antenna that is arranged:
      in or on the at least one inductive charging coil,
      within the at least one inductive charging coil,
      between charging coils of the at least one inductive charging coil,
      at a location that is displaced in parallel to the coil axis of one or more charging coils of the at least one inductive charging coil in relation to a location in a given region of the one charging coil, in relation to a location within the one charging coil, in relation to a location between the charging coils, or in relation to any combination thereof, or
      any combination thereof; and
   electromagnetic field screening for the at least one inductive charging coil and the electric or dielectric antenna,
   wherein both the at least one inductive charging coil and the electric or dielectric antenna are arranged on a same side of the electromagnetic field screening.

2. The inductive charging device of claim 1, wherein the inductive charging device forms a primary side of an inductive charging system.

3. The inductive charging device of claim 1, wherein the inductive charging device forms a secondary side of an inductive charging system.

4. The inductive charging device of claim 1, wherein the electric or dielectric antenna is arranged at a location that is displaced, in parallel to the coil axis, in relation to a location of the geometrical center of gravity of a charging coil interior, at a location of the geometrical center of gravity of a charging coil interior, or in relation to a location of the geometrical center of gravity of a charging coil interior and at a location of the geometrical center of gravity of a charging coil interior.

5. The inductive charging device of claim 1, wherein the electric or dielectric antenna is an electric antenna, and
   wherein the electric antenna comprises at least one dipole antenna, the at least one dipole antenna comprising one or more dipoles.

6. The inductive charging device of claim 1, wherein the electric or dielectric antenna is a dielectric antenna, and
   wherein the dielectric antenna comprises at least one waveguide.

7. The inductive charging device of claim 6, wherein the electromagnetic field screening comprises a penetration, through which the waveguide is routed.

8. The inductive charging device of claim 1, wherein the electric or dielectric antenna is a dielectric antenna, and
   wherein the dielectric antenna is or is provided with a dielectric resonator antenna.

9. The inductive charging device of claim 1, wherein the electromagnetic field screening extends to both the at least one inductive charging coil and the electric or dielectric antenna.

10. An electric vehicle comprising:
   an inductive charging device comprising:
      at least one inductive charging coil wound around a coil axis; and
      an electric or dielectric antenna that is arranged:
         in or on the at least one inductive charging coil,
         within the at least one inductive charging coil,
         between charging coils of the at least one inductive charging coil,
         at a location that is displaced in parallel to the coil axis of one or more charging coils of the at least one inductive charging coil in relation to a location in a given region of the one charging coil, in relation to a location within the one charging coil, in relation to a location between the charging coils, or in relation to any combination thereof, or
         any combination thereof; and
      electromagnetic field screening for the at least one inductive charging coil and the electric or dielectric antenna,
   wherein both the at least one inductive charging coil and the electric or dielectric antenna are arranged on a same side of the electromagnetic field screening.

11. The electric vehicle of claim 10, wherein the electromagnetic field screening extends to both the at least one inductive charging coil and the electric or dielectric antenna.

12. A charging station comprising:
   an inductive charging device comprising:
      at least one inductive charging coil wound around a coil axis; and
      an electric or dielectric antenna that is arranged:
         in or on the at least one inductive charging coil, within the at least one inductive charging coil,
between charging coils of the at least one inductive charging coil,
at a location that is displaced in parallel to the coil axis of one or more charging coils of the at least one inductive charging coil in relation to a location in a given region of the one charging coil, in relation to a location within the one charging coil, in relation to a location between the charging coils, or in relation to any combination thereof, or any combination thereof; and
electromagnetic field screening for the at least one inductive charging coil and the electric or dielectric antenna,
wherein both the at least one inductive charging coil and the electric or dielectric antenna are arranged on a same side of the electromagnetic field screening.

13. The charging station of claim 12, wherein the electromagnetic field screening extends to both the at least one inductive charging coil and the electric or dielectric antenna.

14. A method for inductive charging using one or two charging devices, each of the one or two charging device comprising at least one inductive charging coil wound around a coil axis, and an electric or dielectric antenna that is arranged:
in or on the at least one inductive charging coil,
within the at least one inductive charging coil,
between charging coils of the at least one inductive charging coil,
at a location that is displaced in parallel to the coil axis of one or more charging coils of the at least one inductive charging coil in relation to a location in a given region of the one charging coil, in relation to a location within the one charging coil, in relation to a location between the charging coils, or in relation to any combination thereof, or
any combination thereof, and
electromagnetic field screening for the at least one inductive charging coil and the electric or dielectric antenna, wherein both the at least one inductive charging coil and the electric or dielectric antenna are arranged on a same side of the electromagnetic field screening,
the method comprising:
transmitting, by the at least one inductive charging coil, energy to one of the charging devices; and
transmitting, by the electric or dielectric antenna, communication data to one of the charging devices, respectively.

15. The method of claim 14, wherein the electromagnetic field screening extends to both the at least one inductive charging coil and the electric or dielectric antenna.

\* \* \* \* \*